July 1, 1930.   C. A. PARRATT   1,769,453
RAT TRAP
Filed Aug. 7, 1929   4 Sheets-Sheet 1

C. A. Parratt, INVENTOR
BY Victor J. Evans
ATTORNEY

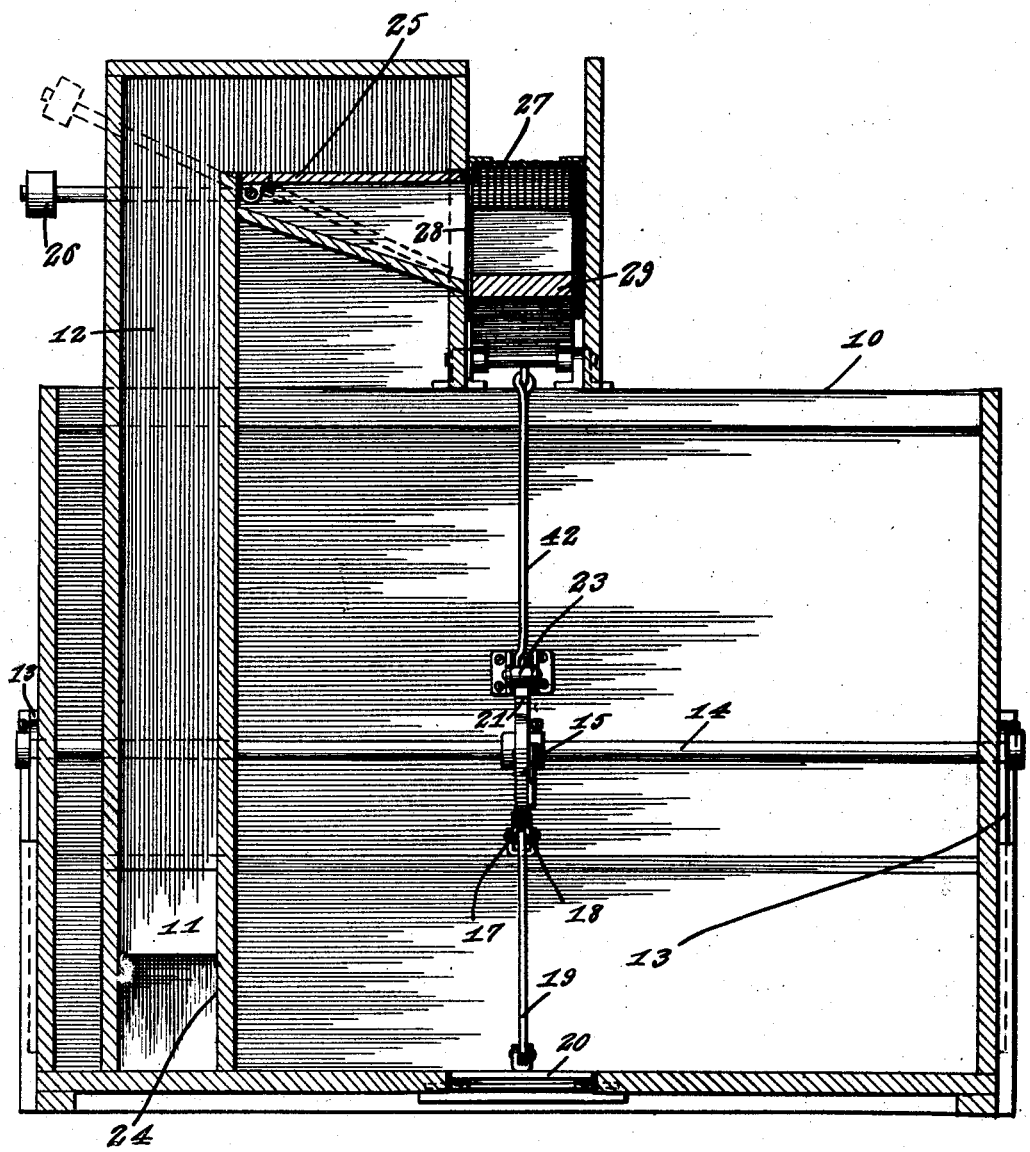

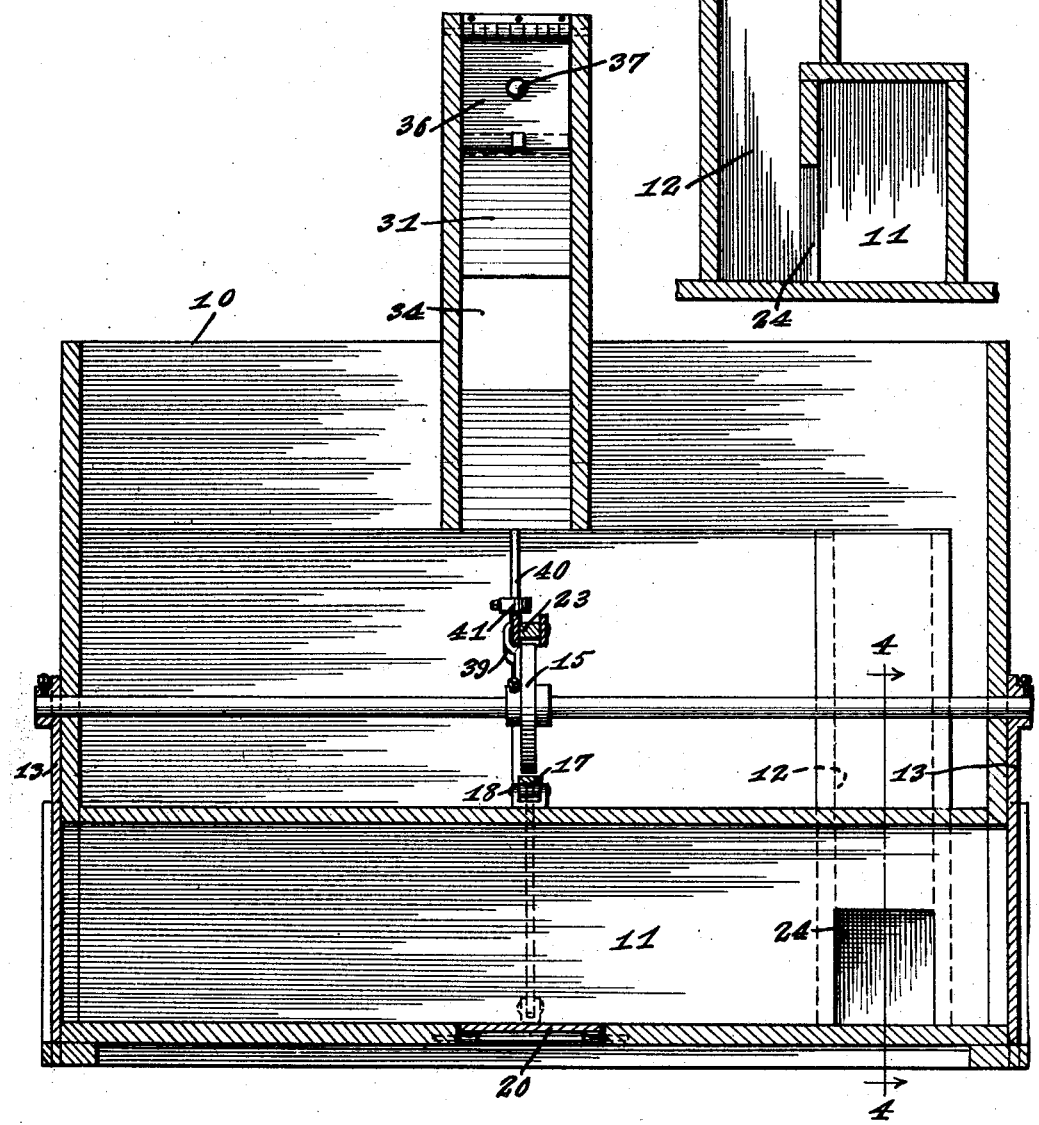

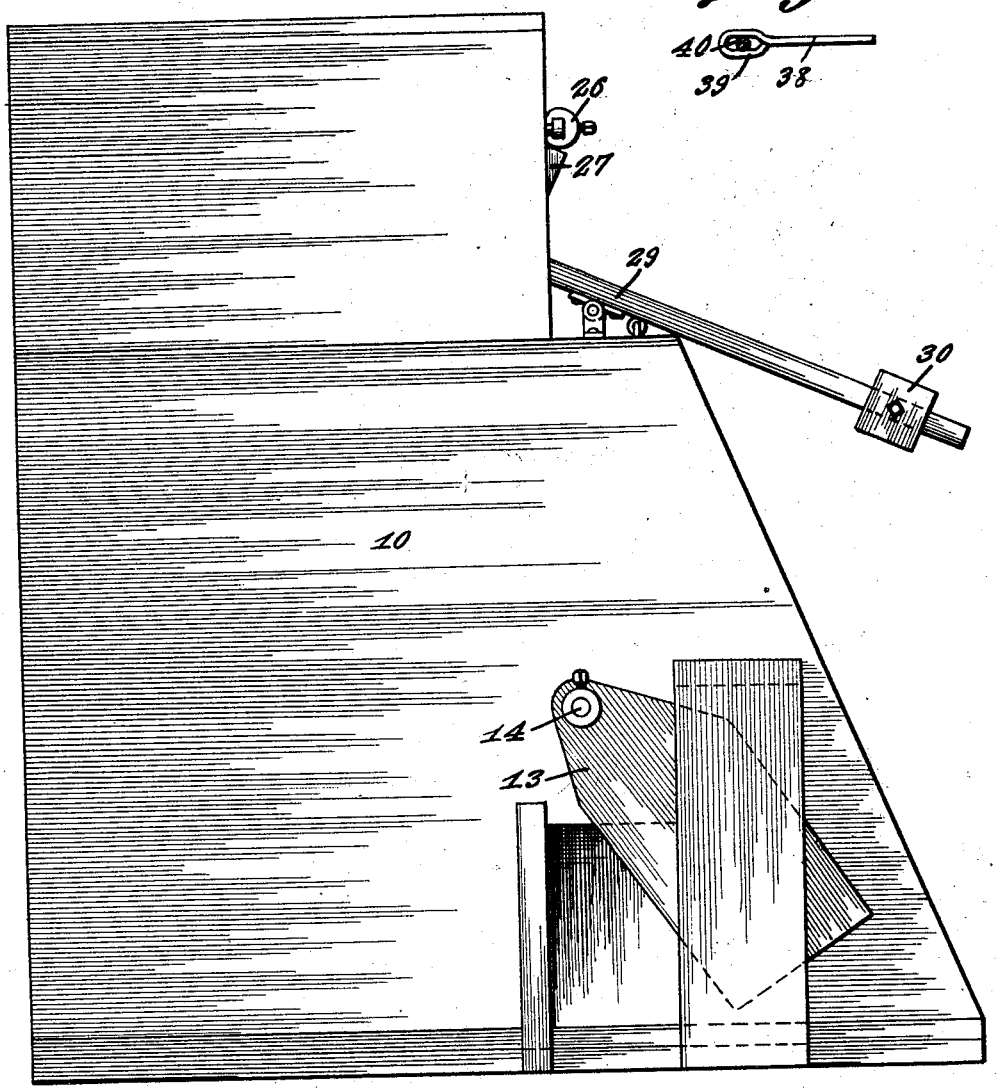

Patented July 1, 1930

1,769,453

UNITED STATES PATENT OFFICE

COLUMBUS A. PARRATT, OF CLEBURNE, TEXAS

RAT TRAP

Application filed August 7, 1929. Serial No. 384,002.

The present invention contemplates the provision of a self-set and every-ready trap, and resides in the novel construction, combination and arrangement of parts hereinafter claimed.

In the drawings forming part of this application like numerals of reference indicate similar parts in the several views, and wherein:—

Figure 2 is a sectional view on line 2—2 of Figure 1.

Figure 3 is a sectional view on line 3—3 of Figure 1.

Figure 4 is a sectional view on line 4—4 of Figure 3.

Figure 5 is a side elevation of the trap.

Figure 6 is a sectional view on line 6—6 of Figure 1.

Figure 1:
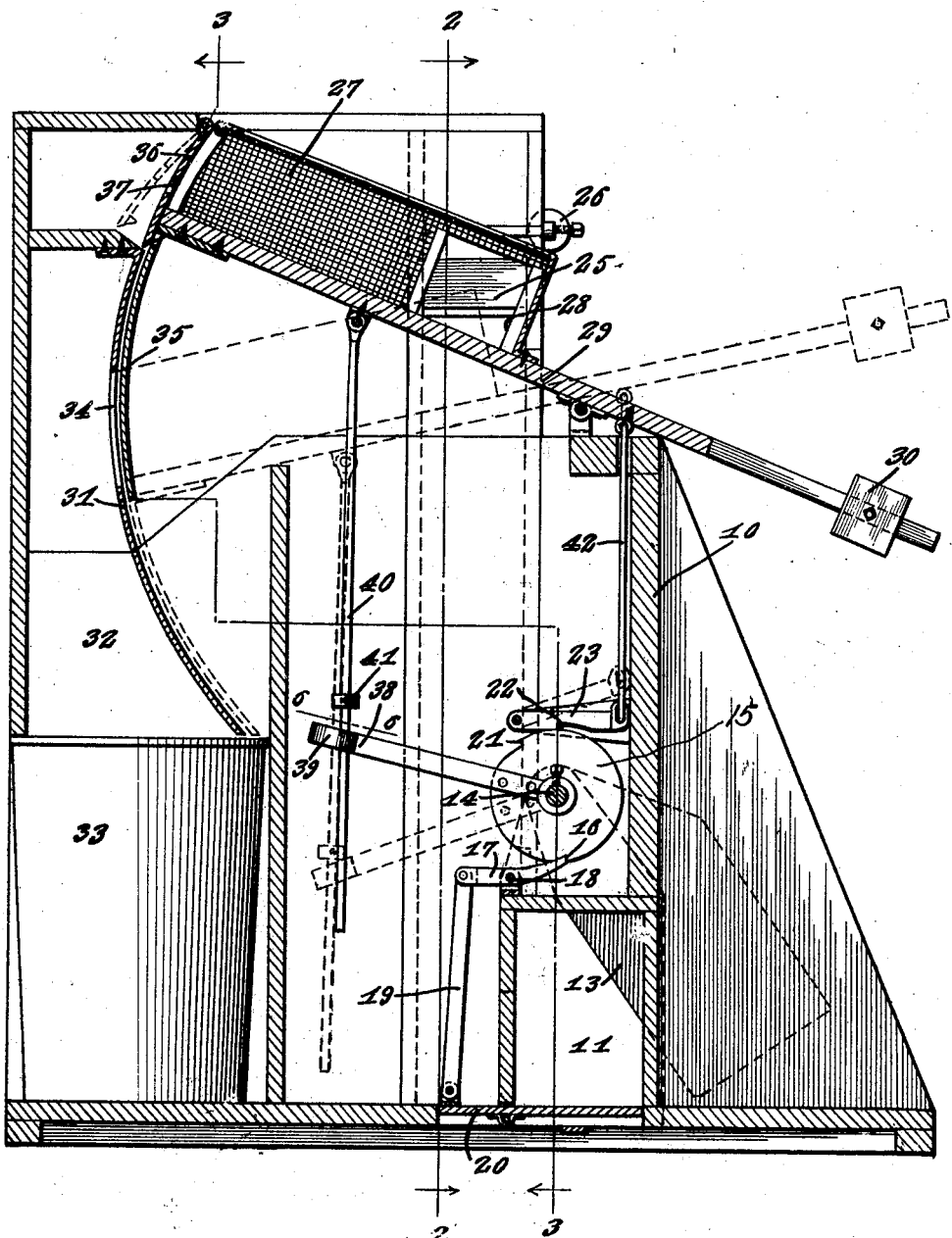
Figure 1 is a vertical sectional view through the trap forming the subject matter of the present invention.

The invention is primarily constructed to trap small animals, and essentially embodies a casing 10 which may be constructed from any suitable material, and also vary in size and configuration without departing from the spirit of the invention. The casing is divided into a plurality of communicating compartments, one of which is indicated at 11, located adjacent the bottom of the casing and extending across the entire width thereof, while 12 indicates another compartment which is arranged vertically as clearly illustrated in Figure 2. The compartment 11 has an entrance opening at each side of the casing, and each opening is controlled by a door 13. These doors are mounted on a shaft 14 which is journaled in the opposed side walls of the casing 10 as clearly illustrated in Figure 2, and when in opened position are arranged as illustrated in Figure 5. These doors are normally maintained in their opened position, and are associated with animal actuated means which effect a release of the doors to allow them to gravitate to their closed positions in a manner to be presently described.

For this purpose I employ a disk 15 mounted upon the shaft 14, and which disk is formed with a notch 16 to receive a pawl 17 which is pivoted upon the top of the compartment 11 as at 18. The pawl 17 when arranged in the manner illustrated in Figure 1, serves to hold the doors 13 in their opened position, but this pawl 17 is pivotally connected with the adjacent end of a vertically disposed link 19, the lower end of which is pivotally connected with a tilting platform 20 constituting the bottom of the compartment 11. Manifestly when the animal enters the compartment 11 and steps upon the platform 20, the latter is depressed thereby elevating the link 19 and releasing the disk 15 from the pawl 17, whereupon the doors 13 move to their closed position. The disk 15 is also provided with a notch 21 adapted to be engaged by the shoulder 22 formed on a locking lever 23, when the doors are moved to their closed position, and thereby prevent opening of the doors under any circumstances, until the animal reaches a certain position within the trap, through a course which it is forced to follow. After the animal has entered the compartment 11, and the doors 13 have been closed, there is no other avenue of escape except through an opening 24 into the compartment 12 as illustrated in Figure 4, and after the animal enters this compartment 12, and climbs upwardly therein, the animal steps upon a pivoted platform 25, suitably counterbalanced by a weight 26, and which platform 25 controls the communication between the compartment 12 and the cage 27.

The cage is preferably constructed from some foraminated material, and as illustrated in Figure 2 the cage is provided with an opening 28 at one side thereof, which is normally covered or closed by the normal position of the pivoted platform 25, but when the animal steps upon this platform and depresses the latter to the dotted line position illustrated in Figure 2, the animal is manifestly delivered into the cage 27 through the opening 28.

The cage 27 is supported upon a pivoted platform 29 suitably counterbalanced by an adjustable weight 30, the normal position of this platform being illustrated in Figure 1. Upon inspection of this figure it will be noted that the casing 10 is divided by a curved wall or partition 31 into an additional compartment indicated at 32, in which is arranged a water containing receptacle 33. The curved wall or partition is formed at an appropriate point with an opening 34 normally covered or closed by an apron 35 depending from the platform 29. Immediately above the curved partition 31 is a hinged door 36 which normally closes the adjacent open end of the cage 27, but this door is primarily intended to engage the platform 29 and support the latter in its elevated position as illustrated in Figure 1. This hinged door 36 is also provided with a restricted opening 37, and when the parts are arranged in the position illustrated in Figure 1, with the animal trapped within the cage 27, the animal will attempt to escape through the opening 37, thereby moving the hinged door 36 to the position illustrated by dotted lines in Figure 1. When in this position, the platform 29 is released and allowed to gravitate to the position illustrated by dotted lines, until the open end of the cage 27 is brought into registration with the opening 34 in the curved wall or partition 31, whereupon the animal is delivered from the cage through the opening 34 into the water containing tank 33, and therein drowned.

It is of course, to be understood that the doors 13 during this operation remain closed, but are automatically opened by means actuated incident to the descent of the platform 29. For this purpose I employ an arm 38 which projects from the shaft 14, and terminates in a loop 39. A rod 40 depends from the platform 29 and passes through the loop extremity 39, the rod 40 carrying a collar 41. Also depending from the platform 29 is a rod 42 which is terminally connected with the locking lever 23 above referred to, but it will be noted upon inspection of Figure 1, that the rods 40 and 42 respectively are located at opposite sides of the pivot for the platform 29. Consequently when the platform begins to tilt under the weight of the animal, the doors 13 are of course, locked in their closed position, but as the platform moves in the manner stated, a pull is exerted upon the rod 42, thereby releasing the disk 15 from the locking lever 23, while at the proper time the collar 41 carried by the rod 40 strikes the arm 38 to move it from the position illustrated in full lines in Figure 1 to the position it occupies by dotted lines in the same figure, which movement of the arm turns the shaft 14 and consequently moves the doors 13 to their opened position. In this manner the trap is set for another operation, it being readily understood that after the animal has been delivered from the cage 27 into the water containing tank 33, the platform under the weight 30 is automatically returned to its normal elevated position.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim is:—

1. An animal trap comprising a casing dividing into a plurality of communicating compartments, one of which has an entrance opening, a door for said opening, means for normally holding said door open, and animal actuated to effect release of said door, means for automatically locking said door when closed, a cage mounted for pivotal movement and having an entrance opening communicating with another of said compartments, a pivoted platform controlling said communication and normally covering the entrance to the cage, and adapted to be tilted by the animal to deliver the latter into the cage, a water containing receptacle arranged within the casing, and means whereby the animal is delivered to the receptacle from the cage as the latter is depressed by the weight of the animal.

2. An animal trap comprising a casing divided into a plurality of communicating compartments, one of which has an entrance opening, a door for said opening means for normally holding said door open, and animal actuated to effect release of the door, means for automatically locking said door closed, a normally elevated cage mounted for pivotal movement and having an entrance opening communicating with another of said compartments, a pivoted platform controlling said communication and normally covering the entrance to said cage, and adapted to be tilted by the animal to deliver the latter into the cage, a water containing receptacle arranged within the casing, means whereby the animal is delivered to the receptacle from the cage as the latter is depressed by the weight of the animal, means simultaneously operable to effect release of said door, and means for automatically reopening said door as said cage is depressed.

3. An animal trap comprising a casing divided into a plurality of communicating compartments, one of which has an entrance opening, a door for said opening, means for normally holding said door open and animal actuated to effect release of said door, means for automatically locking said door closed, a normally elevated cage, a pivotally mounted platform supporting said cage, said cage having an entrance opening communicating with another of said compartments, a pivoted platform controlling said communication and normally covering the entrance opening to the cage, and adapted to be tilted by the animal to deliver the latter into the cage, a water containing receptacle within the casing, means whereby the animal is delivered to the receptacle from the cage as its supporting platform is depressed by the weight of the animal, means connected with the last mentioned platform for effecting a release of said door when the platform is depressed, and means connected with the platform and actuated thereby for automatically opening said door as the platform is lowered.

4. An animal trap comprising a casing divided into a plurality of communicating compartments, one of which has an entrance opening, a door for said opening, means for normally holding said door open, and animal actuated to effect release of said door, means for automatically locking said door closed, a pivoted platform, a cage supported upon the platform and having an entrance opening communicating with another of said compartments, a pivoted platform controlling said communication and normally covering the entrance to said cage, and adapted to be tilted by the animal to deliver the latter into the cage, means for holding the first mentioned platform normally elevated and also serving to close the adjacent end of the cage, a curved partition arranged within the casing and dividing the latter into an additional compartment, a water container arranged in the last mentioned compartment, said curved partition having an opening therein arranged above said container, and through which the animal is delivered from the cage into said container incident to the movement of said platform in a downward direction, and means for automatically returning the platform and cage to their normal elevated position.

5. An animal trap comprising a casing divided into a plurality of communicating compartments, one of which has an entrance opening, a door for said opening, means for normally holding said door open, and animal actuated to effect release of said door, means for automatically locking said door closed, a pivoted platform within said casing, a cage supported on said platform and having an entrance opening communicating with another of said compartments, a pivoted platform controlling said communication and normally covering the entrance to the cage, and adapted to be tilted by the animal to deliver the latter to the cage, a curved partition arranged within the casing and dividing the latter into an additional compartment, a water container arranged within the latter mentioned compartment, said partition having an opening therein, a pivoted door normally supporting the first mentioned platform in an elevated position and closing the adjacent end of the cage, and adapted to be opened by the animal to effect release of said platform, whereupon the animal is delivered from the cage to said water container through the opening in said curved partition, means actuated by said platform for effecting release of the first mentioned door, means controlled by said platform for automatically opening the door as the animal is delivered from said cage, and means for automatically returning the platform and cage to their normal position.

6. An animal trap comprising a casing divided into a plurality of communicating compartments, one of which is located adjacent the bottom of the casing and extends across the entire width thereof, and provides entrance openings at opposite sides of the casing, a door for each opening, means for normally holding said doors open, and animal actuated to effect simultaneous release of said doors, means for locking said doors when closed, a cage mounted for pivotal movement and having an entrance opening communicating with another of said compartments, a pivoted platform controlling said communication and normally covering the entrance to the cage, and adapted to be tilted by the animal to deliver the latter into the cage, a water containing receptacle arranged within the casing, and means whereby the animal is delivered into the receptacle from the cage as the latter is depressed by the weight of the animal.

In testimony whereof I affix my signature.

COLUMBUS A. PARRATT.